(12) United States Patent
Song

(10) Patent No.: US 6,452,896 B1
(45) Date of Patent: Sep. 17, 2002

(54) AUTO BALANCING APPARATUS FOR DISK DRIVE WITH GUIDE

(75) Inventor: Geun Hyuk Song, Pyungtaek (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/364,072

(22) Filed: Jul. 30, 1999

(30) Foreign Application Priority Data

Aug. 13, 1998 (KR) .............................................. 98/32897

(51) Int. Cl.[7] .............................................. G11B 23/00
(52) U.S. Cl. ...................................................... 369/263
(58) Field of Search ................................ 369/263, 266, 369/264; 74/573 R; 310/67 R; 73/460; 360/98.07, 99.04, 99.08

(56) References Cited

U.S. PATENT DOCUMENTS

| | | | | |
|---|---|---|---|---|
| 2,659,243 A | * | 11/1953 | Darrieus | 74/573 R |
| 3,203,273 A | * | 8/1965 | Favrot | 74/573 R |
| 5,111,713 A | * | 5/1992 | Cameron et al. | 74/573 R |
| 5,280,828 A | * | 1/1994 | Reynoso et al. | 188/184 |
| 6,295,269 B1 | * | 9/2001 | Takeuchi et al. | 369/263 |

FOREIGN PATENT DOCUMENTS

| | | | |
|---|---|---|---|
| JP | 62-24052 | * | 2/1987 |
| JP | 10-83622 | * | 3/1998 |
| JP | 10208375 | | 8/1998 |
| KR | 9832661 | | 7/1998 |

OTHER PUBLICATIONS

Transaction of the Japan Society of Mechanical Engineers, Jun. 1979, pp. 645–652.*

Japanese abstract; 10188465; Jul. 21, 1998.

* cited by examiner

*Primary Examiner*—David Davis
(74) *Attorney, Agent, or Firm*—Birch, Stewart, Kolasch & Birch, LLP

(57) ABSTRACT

An auto balancing apparatus for a disk drive including a ball casing having a circular racing space installed concentrically with respect to a rotation member capable of rotating a disk. A plurality of balls roll along a racing face formed in the racing space for implementing a balancing operation. A guide member guides the movements of the balls. The proper guiding of the movements of the balls used for an auto balancing apparatus automatically corrects an unstable rotation of a disk and provides an accurate balancing operation.

16 Claims, 7 Drawing Sheets

AUTO BALANCING APPARATUS FOR DISK DRIVE WITH GUIDE

BACKGROUND OF THE INVENTION

1. Field of the Invention

The present invention relates to an auto balancing apparatus for a disk drive, and in particular to an auto balancing apparatus for a disk drive which is capable of automatically balancing an up and down movement of a disk when a disk mounted on a turntable is rotated.

2. Description of the Background Art

As a disk drive is designed to rotate at a high speed, a disk rotation unbalance problem(an up and down movement of a disk) occurs when a disk is rotated at a high speed.

In the conventional art, it is impossible to implement an accurate signal recording and reproducing operation due to the above-described disk unbalance rotation problems.

The above-described disk unbalance rotation generally occurs due to a non-uniformly fabricated disk. As the disk is designed to rotate at a high speed, the disk unbalance problem is considered as an important problem.

In the case that a disk is not accurately mounted on a turntable and is rotated, the above-described disk unbalance problem may occur.

In order to overcome the above-described disk unbalance rotation problem which generally occurs when the disk is rotated at a high speed, an auto balancing apparatus is introduced by the conventional art. The construction of the auto balancing apparatus will be explained.

As shown in FIG. 1, a rotary shaft 6 is rotatably installed on an upper surface of a substrate 1 in a vertical direction.

A turntable 7 is tightly inserted onto an upper portion of the rotary shaft 6, and a circular member having a certain thickness is formed on a lower surface of the turntable 7, and a ball casing 9 having a space 9a for receiving a plurality of balls 10 therein which are made of a metallic material, is formed in the circular member.

The center portion of the ball casing 9 is tightly inserted onto the rotary shaft 6.

A racing face 9i is formed on an inner wall in the space 8a formed in the ball casing 9. The balls 10 roll on the racing face 9i based on a centrifugal force in order to correct a unbalance rotation which occurs when a disk is rotated at a high speed.

A magnet 11 is engaged at a portion neighboring with the rotary shaft 6 in the inner space 8a of the ball casing 9, buffering portion(not shown) made of a rubber is formed on an outer surface of the magnet 11.

When the apparatus is not driven, the magnet 11 prevents the balls from being freely moved in the space.

A spindle motor 3 is installed below the ball casing 9. A rotor 5 which is one element forming the spindle motor 3 is integrally engaged to the rotary shaft 6. A stator 4 which is one element forming the spindle motor 3 is installed on an upper surface of the substrate and is fixed on an outer surface of a bearing 2 inserted onto the rotary shaft 6.

In the drawings, reference numeral 5M represents a magnet of the rotor 5, 8 represents a clamp for fixing the disk, and 16 represents a rubber which contacts with a lower surface of the disk and supports the disk.

The operation of the conventional auto balancing unit will be explained.

First, as the spindle motor 3 is driven, the rotor 5 is rotated, and the rotary shaft 6 is rotated. As the rotary shaft 6 is rotated, the turntable 2 is rotated, so that the disk mounted on the upper surface of the turntable 2 is rotated.

At this time, when the disk is rotated at a high speed, and an unbalance rotation problem occurs at the disk, the balls 10 inserted in the ball casing 9 are moved along the racing face 9i of the ball casing 9 and the unbalance rotation of the disk is corrected.

Namely, when the rotation of the disk exceeds a certain speed and an unbalance disk rotation problem occurs, the balls 10 are moved to a portion in which a certain resonance occurs. As a result, the unbalance rotation of the disk is corrected.

The above-described conventional auto balancing apparatus has the following problems.

First, the balls move freely in the interior of the ball casing in the radial direction, and the rotation cycle of the turntable and the rotation cycle of the balls are different. As a result, a self-excited vibration occurs, which makes it is impossible to implement a balancing operation.

In addition, magnets are serially installed on the portions around the rotary shaft. When the apparatus is not driven, the balls are pulled in one direction and then, are attached to the magnets. The attachment of the balls to the magnets results in an improper balancing operation.

When using the disk drive in a vertical direction, the balls are not rotated based on the centrifugal force. As a result, the balls do not properly race on the racing face of the ball casing, and it is impossible to implement a balancing operation.

The spindle motor, the ball casing and the turntable are sequentially installed below the rotary shaft installed on the upper surface of the substrate in the vertical direction. Thus, large space for installing the above-described elements is required, and the entire height of the disk drive apparatus is increased.

Namely, since the ball casing for implementing an auto balancing operation is positioned between the turntable and the spindle motor, the length of the rotary shaft is increased, and the entire height of the disk drive is increased.

Furthermore, when separately forming the spindle motor, the ball casing and the turntable, the total weight of the elements which are rotated by the spindle motor is increased, and the power consumption for driving the spindle motor is increased.

SUMMARY OF THE INVENTION

Accordingly, it is an object of the present invention to provide an auto balancing apparatus for a disk drive, which is capable of implementing an accurate balancing operation to automatically correct unstable rotation of a disk by properly guiding the movements of the balls used for an auto balancing apparatus.

It is another object of the present invention to provide an auto balancing apparatus for a disk drive, which makes it possible to decrease the occurrence of a self-excited vibration by preventing the balls from being slid during an auto balancing operation.

It is another object of the present invention to provide an auto balancing apparatus for a disk drive which is capable of preventing the balls used for an auto balancing operation from being moved in a certain direction when the apparatus is not driven.

It is another object of the present invention to provide an auto balancing apparatus for a disk drive, which is capable of decreasing the space needed for installing an auto balancing unit therein and the driving force required for rotating a disk.

To achieve the above objects, there is provided an auto balancing apparatus for a disk drive according to the present invention, which includes a ball casing having a circular racing space and installed concentrically with respect to a rotation member for rotating a disk. A plurality of balls which roll along a racing face formed in the racing space for implementing a balanced operation, and a guide member for guiding the movements of the balls.

Additional advantages, objects and features of the invention will become more apparent from the description which follows.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

The embodiments of the present invention will be explained with reference to the accompanying drawings.

Figure 1:
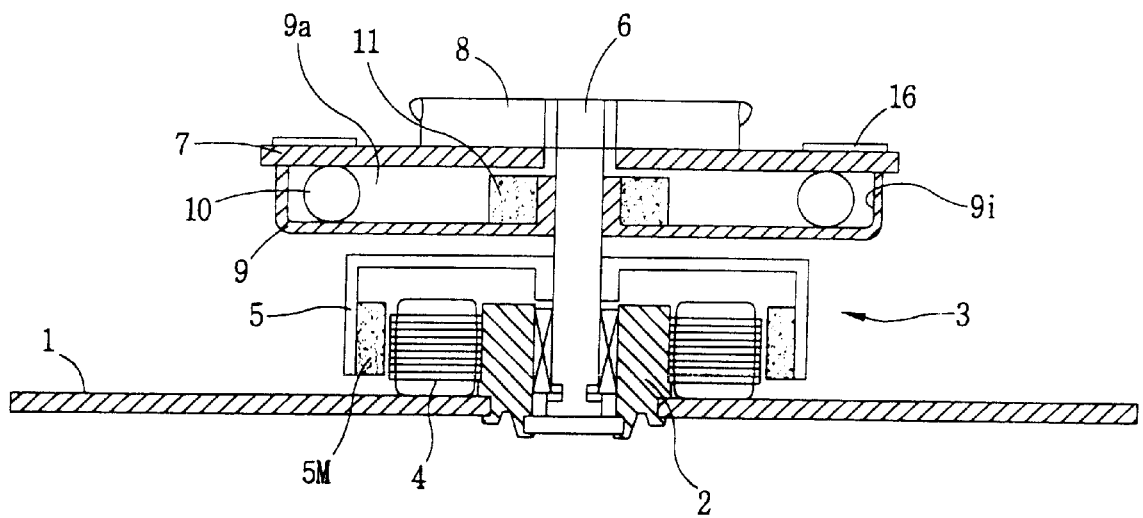
FIG. 1 is a cross-sectional view illustrating an auto balancing apparatus for a conventional disk drive.
Figure 2:
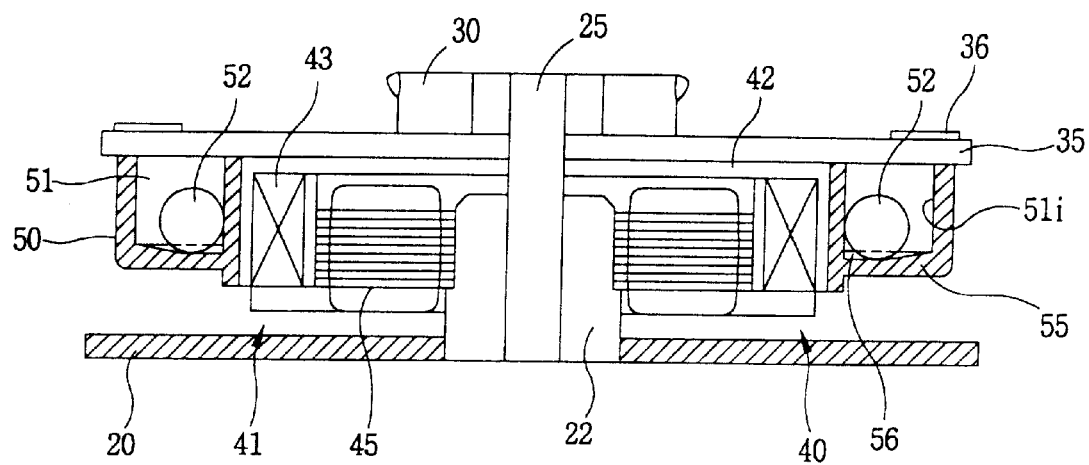
FIG. 2 is a cross-sectional view illustrating the construction of an auto balancing apparatus for a disk drive according to a first embodiment of the present invention.
Figure 3:
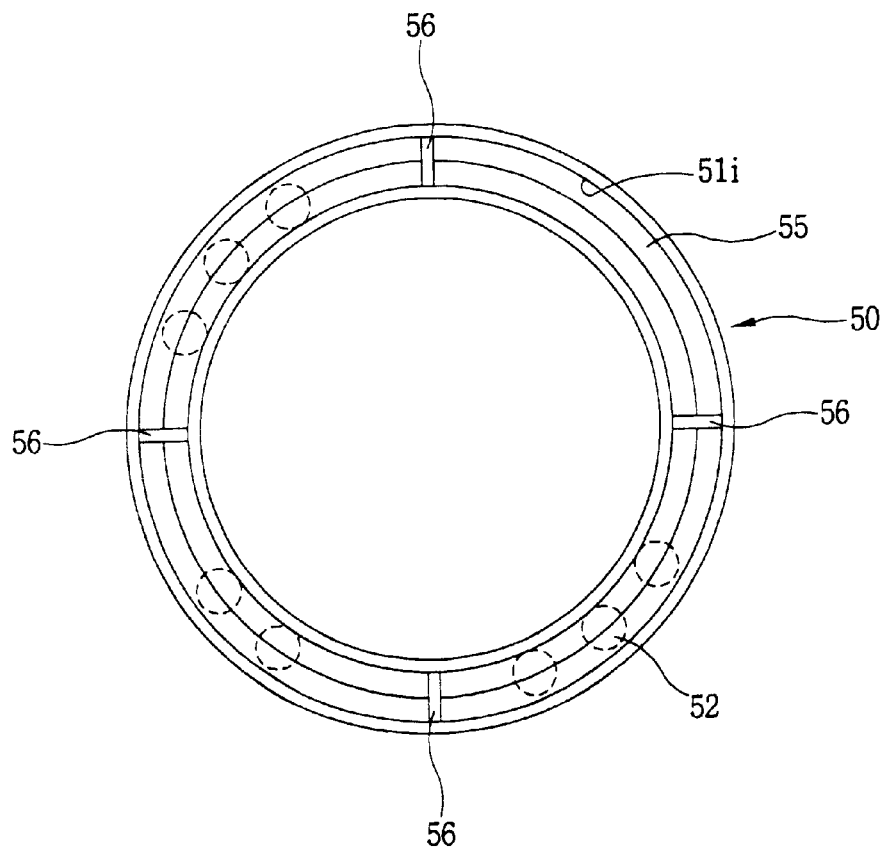
FIG. 3 is a plan view illustrating an inner construction of a ball casing according to a first embodiment of the present invention.

As shown in FIGS. 2 through 4, in an auto balancing apparatus for a disk drive according to a first embodiment of the present invention, a rotary shaft 25 is rotatably installed on an upper surface of a substrate 20 in a vertical direction, and a bearing 22 is inserted onto a lower outer surface of the rotary shaft 25.

A turntable 35 on which a disk is mounted is inserted onto an upper portion of the rotary shaft 25.

Therefore, the rotary shaft 25 and the turntable 35 are integrally rotated.

A clamp 30 for fixing the disk is installed at an upper portion of the turntable 35. In addition, a circular shape ball casing 50 is installed below the turntable 35. The casing 50 is extended from an outer lower end portion of the turntable 35 and is bent towards center portion of the turntable 35. Then the casing 50 is extended and bent towards the lower surface of the turntable 35 and is extended to the lower surface of the turntable 35.

Namely, the upper surface of the ball casing 50 is formed of a lower surface of the turntable 35, and the center portion of the ball casing 50 and 35 are concentrical. Also, to the turntable 35, and a circular racing space 51 is formed in the interior of the ball casing 50, and a plurality of balls 52 are received in the interior of the racing space 51.

At this time, the racing space 51 is formed to have a width which does not exceed two times of the diameter of each ball 52. The balls 52 are preferably made of a metallic material.

An inner wall of the racing space 51 becomes a racing face 51i along which the balls roll based on the centrifugal force during the balancing operation for correcting the unbalance rotation of the disk. The balls 52 roll along the racing face 51i in the circumferential direction for implementing a balancing operation.

Figure 4A:
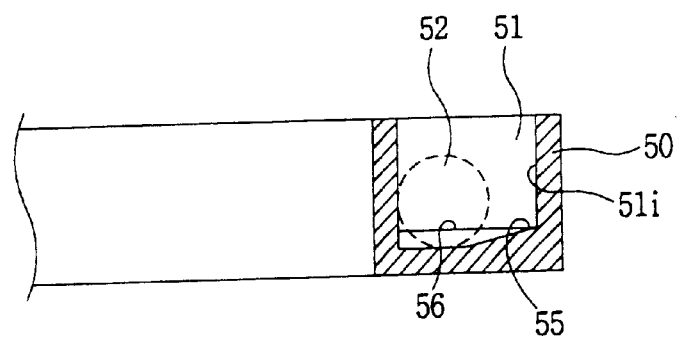
FIG. 4A is a cross-sectional view illustrating the position of balls before an auto balancing operation is performed according to a first embodiment of the present invention.
Figure 4B:
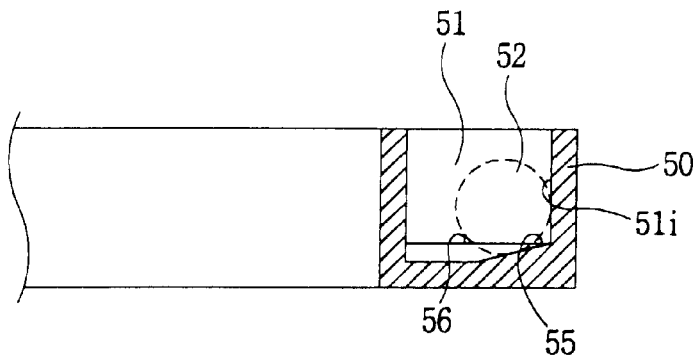
FIG. 4B is a cross-sectional view illustrating the position of balls during an auto balancing operation according to a first embodiment of the present invention.

As shown in FIGS. 3 through 4B, an inclined surface 55 is formed on an inner floor of the ball casing 50 and is upwardly inclined from the center portion toward the racing face 51i. Therefore, when the turntable 35 is rotated and a balancing operation is performed, the inclined surface 55 guides the balls 52 to roll on the racing face 51i.

A plurality of ribs 56 are formed on the floor of the racing space 51 for implementing a proper balancing operation even when the disk drive is installed in the vertical direction (for example, when the disk mounted on the turntable 35 is vertical with respect to the surface of the ground).

Namely, when the disk drive is vertically installed with respect to the surface of the ground, the ribs 56 prevent the balls 52 from being moved by gravity to the lowest portion of the ball casing 50. As a result, the balls 52 are not moved in a certain direction, and it is possible to implement a stable movement of the balls 52.

In the first embodiment of the present invention, as shown in FIG. 3, the ribs 56 are preferably formed at an angle of 90°. The above-described angle is not limited thereto. More preferably, the range of the angle may be varied and determined based on the design conditions.

The spindle motor 40 is installed below the turntable 35 for rotating the turntable 35. The spindle motor 40 includes a stator 45, and a rotator 41 which is rotated based on an electromagnetic operation with the stator 45.

The rotator 41 is engaged to the rotary shaft 25 and is rotated with the rotary shaft 25. The stator 45 of the spindle motor 40 is installed on the upper surface of the substrate and is fixed to the outer surface of the bearing 22 inserted onto the rotary shaft 25.

The rotator 41 includes a rotator yoke 42 installed on a lower surface of the turntable 35 and integrally rotated with the rotary shaft 25. Also and a magnet 43 is attached on an inner surface of the rotator yoke 42.

The stator 45 is installed opposite to the magnet 43 of the rotator yoke 42 in a state that the coils are wound onto the outer surface of the stator 45.

In the drawings, reference numeral 36 represents a rubber which contacts with a portion of the lower surface of the disk for fixing the disk.

The operation of the auto balancing apparatus for a disk drive according to first embodiment of the present invention will be explained with reference to the accompanying drawings.

As shown in FIG. 4A, when the apparatus is not driven, the balls 52 are gathered at an inner portion of the ball casing 50. In this state, when the disk is rotated at a certain speed, as shown in FIG. 4B, the balls 52 are moved along the racing face 51i via the inclined surface 55 based on the centrifugal force.

The balls 52 are moved along the racing face 51i in the circumferential direction for thereby performing a balancing operation of the disk.

At this time, the ribs 56 guide the movements of the balls 52 and prevent the balls 52 from being gathered at a certain portion.

In detail, when the disk is rotated at a lower speed, the ribs 56 collide with the balls 52 gathered at an inner portion in the racing space 51 for thereby preventing the balls 52 from being moved, and preventing the balls 52 from being gathered at a certain portion. In particular, when the disk drive is installed in a vertical direction, the balls 52 are prevented from being moved down toward the racing face 51i formed at the lowest portion of the ball casing 50. During the balancing operation, the balls 52 collide with the upper portions of the ribs 56, and the movements of the balls 52 are accelerated.

The auto balancing apparatus for a disk drive according to the second through seventh embodiments of the present invention will be explained.

The ball casings adapted in the second through seventh embodiments according to the present invention are circular and the same as the first embodiment except for the inner structures of the ball casings. Therefore, only the different inner structures of the ball casings will be explained.

In the second through seventh embodiments of the present invention, the lower surface of the turntable becomes an upper surface of the racing space, and the outer wall of the racing space formed in the interior of the ball casing becomes a racing face on which the balls roll for implementing a balancing operation in the racing space.

Figure 5:
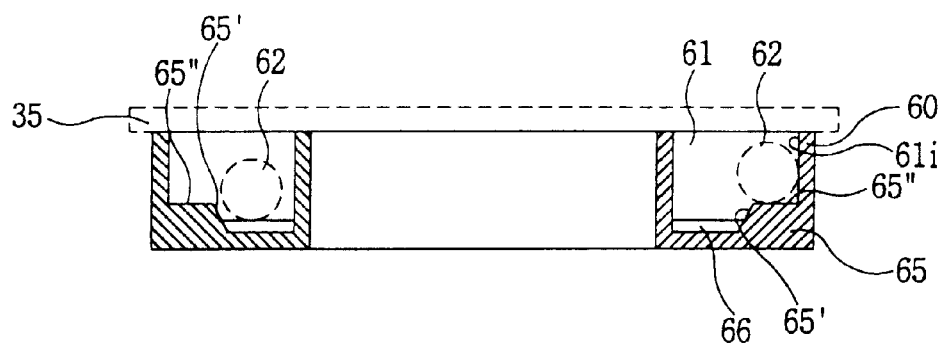
FIG. 5 is a cross-sectional view illustrating the construction of a ball casing for an auto balancing apparatus for a disk drive according to a second embodiment of the present invention.
Figure 6:
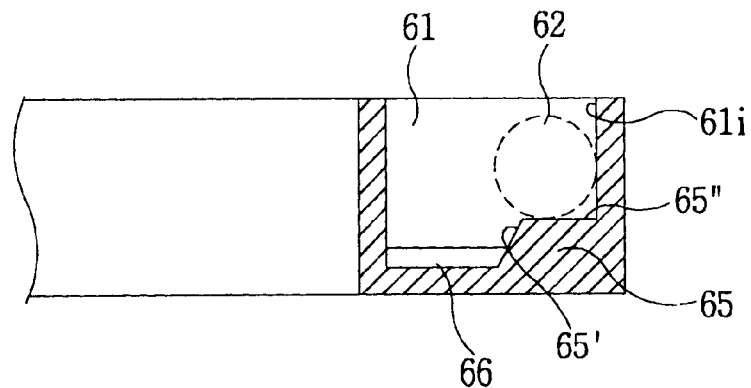
FIG. 6 is a cross-sectional view illustrating the position of balls during an auto balancing operation according to a second embodiment of the present invention.

As shown in FIGS. 5 and 6, in the second embodiment of the present invention, a magnet 66 is installed in the interior of the ball casing 60 formed on the lower surface of the turntable 35, namely, on the floor surface of the racing space 61 which receives the balls 62 therein, and an inclined step portion 65 is formed on an outer side portion in the racing space 61.

The inclined step portion 65 is extended from an outer end portion of the magnet 66 toward the racing face 61i and includes a guide inclined surface 65' formed at a portion neighboring with the magnet 66, and a plane surface 65" formed at a portion neighboring with the racing face 61i.

The operation of the auto balancing apparatus for a disk drive according to a second embodiment of the present invention will be explained.

When the disk is rotated at a lower speed, the balls 62 collide with the magnet 66, so that the balls 62 are not moved.

In this state, when the disk is rotated at a higher speed, the balls 62 roll along the racing face 61i based on the centrifugal force and are moved along the racing face 61i in the circumferential direction.

In detail, the balls 62 are moved off the magnet 66 and are guided along the inclined guide surface 65' of the inclined step portion 65 and are positioned on the plane surface 65". Thereafter, the balls 62 are moved along the racing face 61i on the plane surface 65" in the circumferential direction for implementing a balancing operation.

As shown in FIG. 6, in the second embodiment of the present invention, the plane surface 65" is formed in the interior of the ball casing 60. So, when the balls 61 are moved along the racing face 61i, it is possible to implement a stable balancing operation in which the balls are not moved up and down.

At this time, the balls 62 slightly contact with the lower surface of the turntable 35 which is made of a metallic material and acts as an upper surface of the racing space 61. Therefore, the sliding of the balls 62 during the balancing operation is prevented and it is possible to decrease the occurrence of the self-excited vibration.

The auto balancing apparatus for a disk drive according to a third embodiment of the present invention will be explained.

Figure 7:
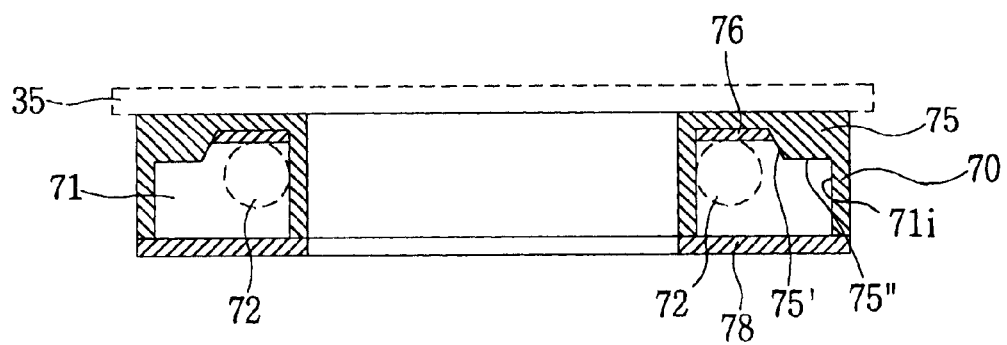
FIG. 7 is a cross-sectional view illustrating the construction of a ball casing for an auto balancing apparatus for a disk drive according to a third embodiment of the present invention.
Figure 8:
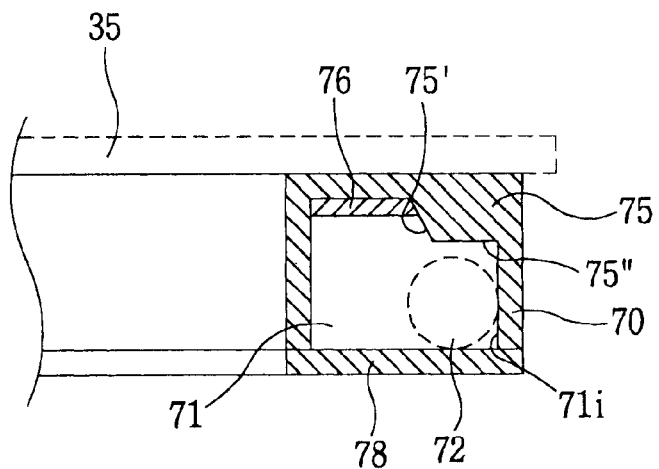
FIG. 8 is a cross-sectional view illustrating the position of balls during an auto balancing operation according to a third embodiment of the present invention.

As shown in FIGS. 7 and 8, in the third embodiment of the present invention, a magnet 76 is installed in the interior of the ball casing 70 installed on the lower surface of the turntable 35 and on the upper surface of the racing space 71 which contacts with the lower surface of the turntable 35 and receives the balls 70 therein, and an inclined step portion 75 is formed on an outer side of the ceiling surface in the racing space 71.

A lower plate 78 made of a metallic material is installed at a lower portion in the racing space 71.

The lower plate 78 becomes a floor of the racing space 71, and the balls 72 do not slide in the racing space 71 by the lower plate 78.

The inclined step portion 75 is extended from an outer end portion of the magnet 76 to the racing face 71i and includes a guide inclined surface 75' formed at a portion neighboring with the magnet 76, and a plane surface 75" formed at a portion neighboring with the racing face 71i.

The operation of the auto balancing apparatus for a disk drive according to the third embodiment of the present invention will be explained.

As shown in FIG. 7, when the disk is rotated at a lower speed, the balls 72 contact with the magnet 76, so that the balls 72 are not moved.

In this state, as shown in FIG. 8, when the disk is rotated at a higher speed, the balls 72 are moved to the racing face 71i by the centrifugal force and roll along the racing face 71i in the circumferential direction.

In detail, the balls 72 are moved from the magnet 76 and are guided along the inclined guide surface 75' of the inclined step portion 75 and are gathered on the plane surface 75". Thereafter, the balls 72 are moved along the racing face 71i on the plane surface 75" in the circumferential direction for thereby implementing a balancing operation.

As shown in FIG. 8, in the third embodiment of the present invention, since the plane surface 75" is formed in the interior of the ball casing 70, when the balls 72 are moved along the racing face 71i, the balls 72 are not moved up and down during implementation of an accurate balancing operation.

The balls 72 slightly contact with the upper surface of the lower plate 78, which is made of a metallic material and forms a lower surface of the racing space 71. As a result, when the balls 72 do not slide during the balancing operation, and any self-excited vibration is decreased.

The auto balancing apparatus for a disk drive according to a fourth embodiment of the present invention will be explained.

Figure 9:
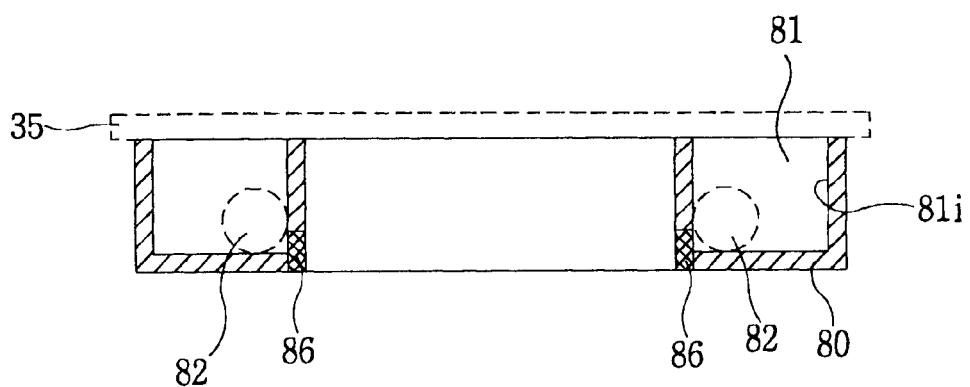
FIG. 9 is a cross-sectional view illustrating the construction of a ball casing for an auto balancing apparatus for a disk drive according to a fourth embodiment of the present invention.
Figure 10:
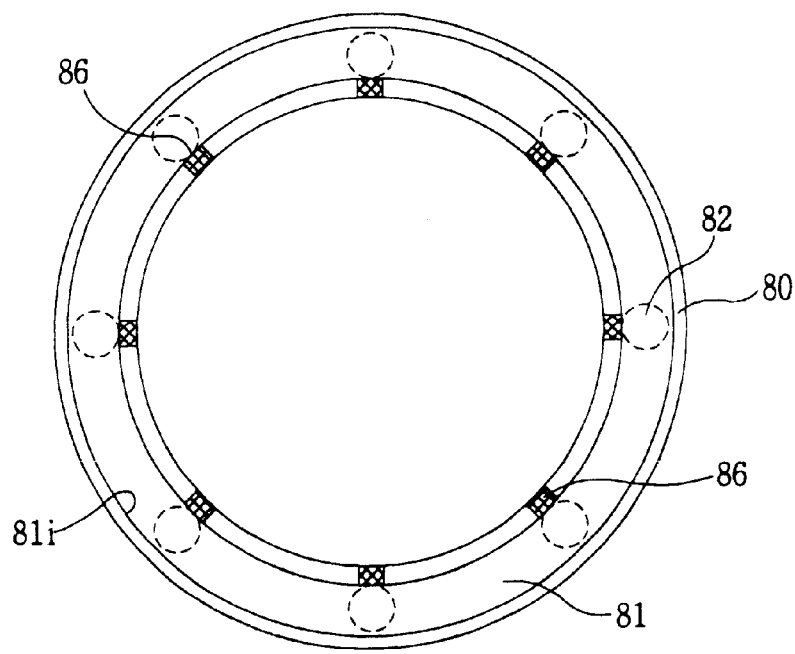
FIG. 10 is a plan view illustrating the construction of a fourth embodiment of FIG. 9.

As shown in FIGS. 9 and 10, in the fourth embodiment of the present invention, a plurality of magnets 86 are installed on an inner wall at a certain interval in the racing space 81 formed in the interior of the ball casing 80 installed on a lower surface of the turntable 35, so that the balls 82 are not moved in the racing space 81 when the turntable is rotated at a lower speed.

As shown in FIGS. 9 and 10, according to the fourth embodiment of the present invention, the magnets may be installed on a certain surface, not on the racing face among the inner surface of the ball casing.

In the thusly constituted fourth embodiment of the present invention, when the turntable 35 is rotated at a lower speed, the balls 82 are spaced-apart from each other by the magnets 86 in the, racing space 81, and the turntable 35 is not unbalanced. When the disk is rotated at a higher speed, the balls 82 are moved toward the racing face 81i by the centrifugal force and are moved along the racing face 81i in the circumferential direction.

The auto balancing apparatus for a disk drive according to a fifth embodiment of the present invention will now be explained.

Figure 11:
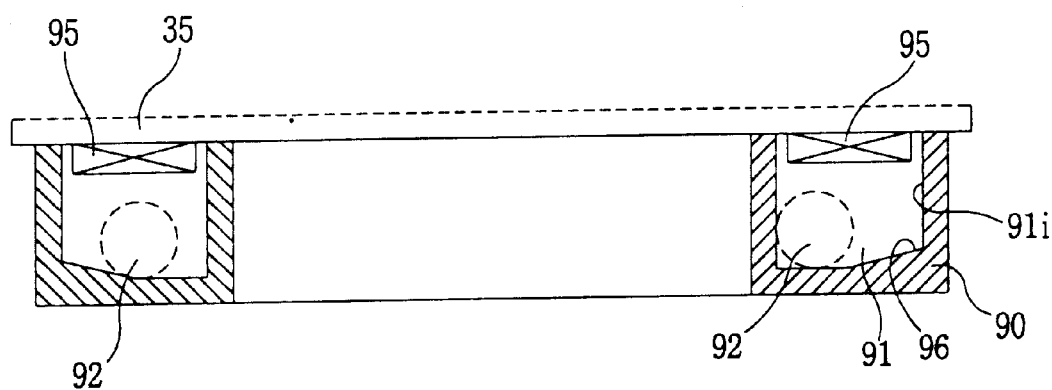
FIG. 11 is a cross-sectional view illustrating the construction of a ball casing for an auto balancing apparatus for a disk drive according to a fifth embodiment of the present invention.

As shown in FIG. 11, in the fifth embodiment of the present invention, a friction seat 95 is attached on a lower surface of the turntable 35 which is the upper surface of the ball casing 90.

The friction seat 95 is preferably formed in a circular shape in such a manner that the friction seat 95 covers the entire upper surfaces of the racing space 91 in the ball casing 90.

The friction seat 95 prevents the balls 92 from being slid when the balls 92 are moved along the facing face 91i during the balancing operation and thereby prevents a self-excited vibration.

In FIG. 11, reference numeral 96 represents an inclined surface.

The auto balancing apparatus for a disk drive according to a sixth embodiment of the present invention will be explained.

Figure 12:
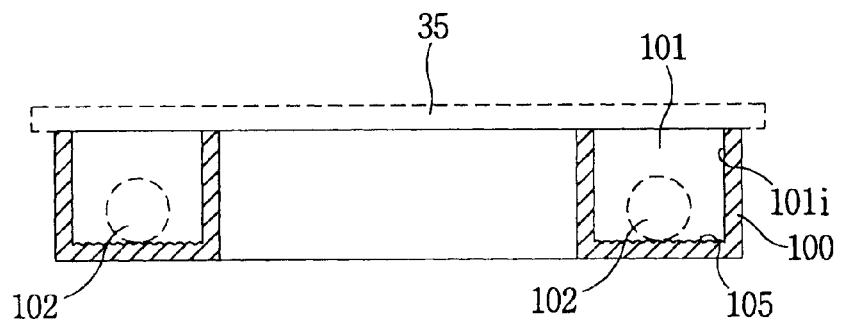
FIG. 12 is a cross-sectional view illustrating the construction of a ball casing for an auto balancing apparatus for a disk drive according to a sixth embodiment of the present invention.

As shown in FIG. 12, in the sixth embodiment of the present invention, a friction rough surface 105 is formed on a floor surface in the racing space 101 formed in the interior of the ball casing 100, which is installed on a lower surface of the turntable 35.

The friction rough surface 105 is formed at an initial stage when fabricating the ball casing 100. Namely, when fabricating the ball casing 100, the friction rough surface 105 is formed by corroding a certain portion of the ball casing 100.

Figure 13:
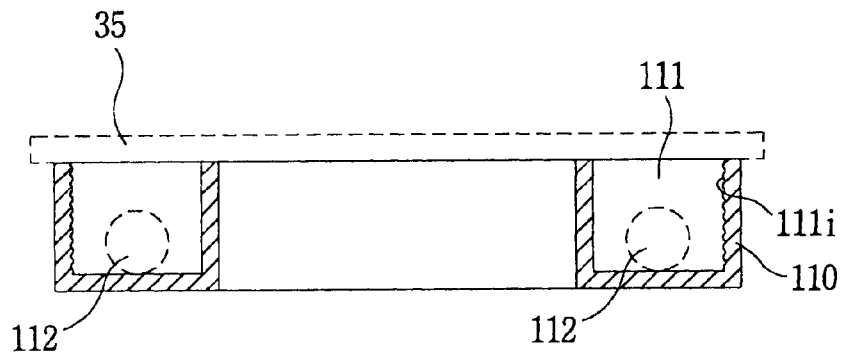
FIG. 13 is a cross-sectional view illustrating the construction of a ball casing for an auto balancing apparatus for a disk drive based on another example of a sixth embodiment of the present invention.

In another example of the sixth embodiment of the present invention, as shown in FIG. 13, the racing face 111i on which the balls 112 roll during the balancing operation may be used as a friction rough surface by corroding the same when fabricating the ball casing 110 without using the corroded surface corresponding to a floor of the racing space 111 as the friction rough surface such as the rough surface 105 in FIG. 13.

The above-described friction rough surfaces prevent a sliding of the balls 102 and 112 when the balls 102 and 112 roll along the racing faces 101i and 111i during the balancing operation. As a result, self-excited vibration is prevented.

As described above, in the auto balancing apparatus for a disk drive according to the present invention, the balls roll along the racing face during the auto balancing operation and any sliding in the racing space is prevented. As a result, it is possible to prevent a self-excited vibration and implement an accurate auto balancing operation.

In addition, since the ball casing is installed at an outer portion of the spindle motor, the distance between the substrate and the turntable is decreased. Thus, the size of the apparatus is significantly decreased.

The ball casing for the auto balancing operation and the rotor of the spindle motor are engaged at the same height as the turntable, and the turntable and the ball casing have the same installation structure. Therefore, the size of the ball casing can be decreased. The total weight of the elements needed to be rotated by the spindle motor is also decreased, making it possible to decrease the loads applied to the spindle motor, and prevent noise. In addition, the apparatus according to the present invention requires a small amount of power, so that it is well applicable to a portable apparatus.

Although the preferred embodiments of the present invention have been disclosed for illustrative purposes, those skilled in the art will appreciate that various modifications, additions and substitutions are possible, without departing from the scope and spirit of the invention as recited in the accompanying claims.

What is claimed is:

1. An auto balancing apparatus for a disk drive, comprising:
   a ball casing having a racing space on a rotation member, said rotation member adapted to rotate a disk;
   said racing space including a racing face and a floor surface;
   a plurality of balls which roll along the racing face for implementing a balancing operation; and
   a guide for guiding movement of the balls,
   wherein said guide includes a limiter which prevents movement of the balls before the balancing operation is performed, and a plurality of ribs formed on the floor surface for guiding movement of the balls and preventing the balls from gathering.

2. The apparatus of claim 1, wherein said guide renders the balls to perform a balancing operation when the rotation member is rotated at a certain speed.

3. The apparatus of claim 1, wherein said guide includes a limiter for limiting the balancing operation of the balls when the rotation member is rotated at a relatively lower rotation speed, and an enhancing member for guiding the balls toward the racing face when said rotation member is rotated at a relatively higher rotation speed.

4. The apparatus of claim 1, wherein said guide includes an enhancing member for guiding the balls on the racing face during the balancing operation.

5. The apparatus of claim 4, wherein said enhancing member includes the plurality of ribs and the plurality of ribs are formed at a certain interval on the floor surface in the racing space.

6. The apparatus of claim 5, wherein said balls collide with the upper portions of the ribs during the balancing operation, and the moving speed of the balls is increased.

7. The apparatus of claim 5, wherein said ribs are spaced-apart at an angle of 90°, respectively.

8. The apparatus of claim 4, wherein said enhancing member is an inclined surface which is upwardly inclined from a center portion of an inner floor surface of the ball casing, which forms the racing space, toward the racing face.

9. The apparatus of claim 4, wherein said enhancing member is an inclined step portion formed at an outer side in the racing space.

10. The apparatus of claim 9, wherein said inclined step portion includes:

an inclined surface extended from the floor surface of the racing space toward the racing face; and a plane surface formed at a portion neighboring the racing face.

11. The apparatus of claim 4, wherein said enhancing member includes:

an inclined step portion formed at an outer portion of the upper surface in the racing space; and a lower plate made of a metallic material and installed at a lower portion in the racing space.

12. The apparatus of claim 11, wherein said inclined step portion includes:

a guide inclined surface extended from an upper surface in the racing space toward the racing face; and a plane surface formed at a portion neighboring with the racing face.

13. The apparatus of claim 1, wherein said limiter includes a plurality of magnets installed at a certain interval on an inner wall surface in the racing space.

14. The apparatus of claim 1, wherein a friction rough surface is formed on a floor portion in the racing space.

15. An auto balancing apparatus for a disk drive, comprising:

a rotation member for rotating a disk;

a ball casing on the rotation member and having a racing space, said racing space including a racing face and a floor surface;

a plurality of balls for implementing a balancing operation by rolling along the racing face; and a guide for guiding a movement of the balls, said guide including a limiter which prevents movement of the balls before the balancing operation is performed, and a ball stroker for guiding movement of the balls preventing the balls from gathering.

16. The apparatus of claim 15, wherein said ball stroker comprises a plurality of ribs formed on the floor surface for guiding movement of the balls and preventing the balls from gathering.

* * * * *